March 24, 1964  J. S. SILVERMAN  3,125,964
TRANSPORTATION APPARATUS
Filed March 22, 1962
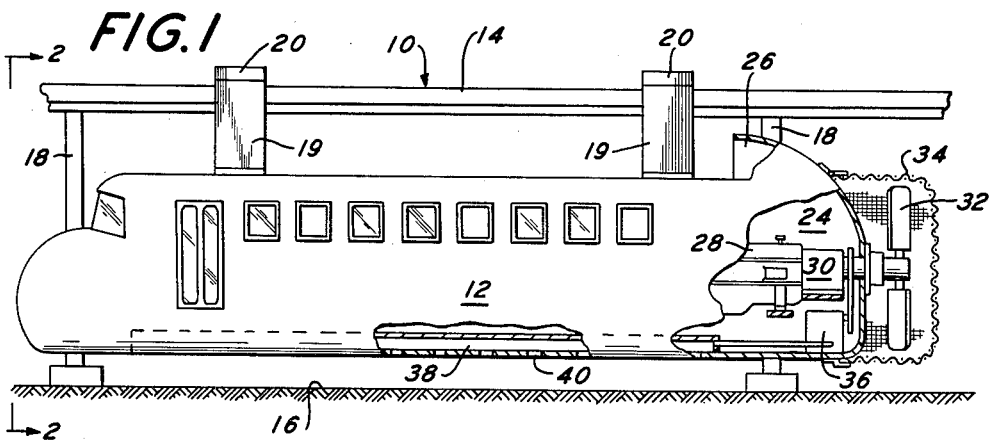
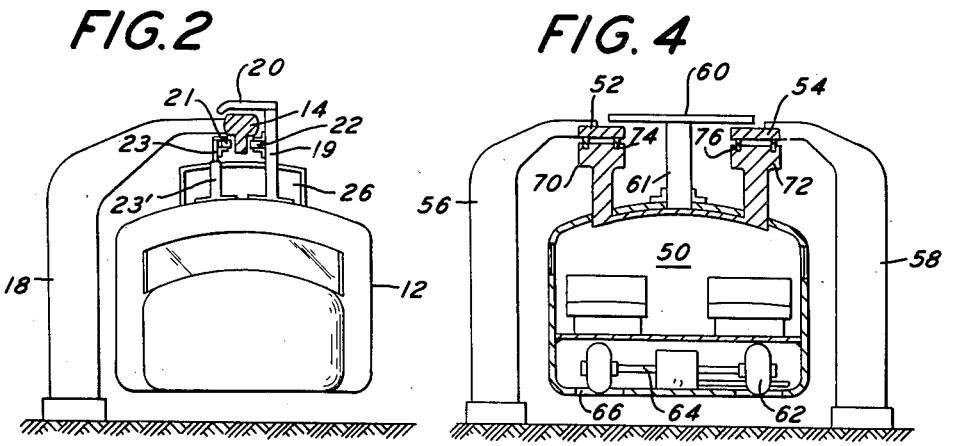
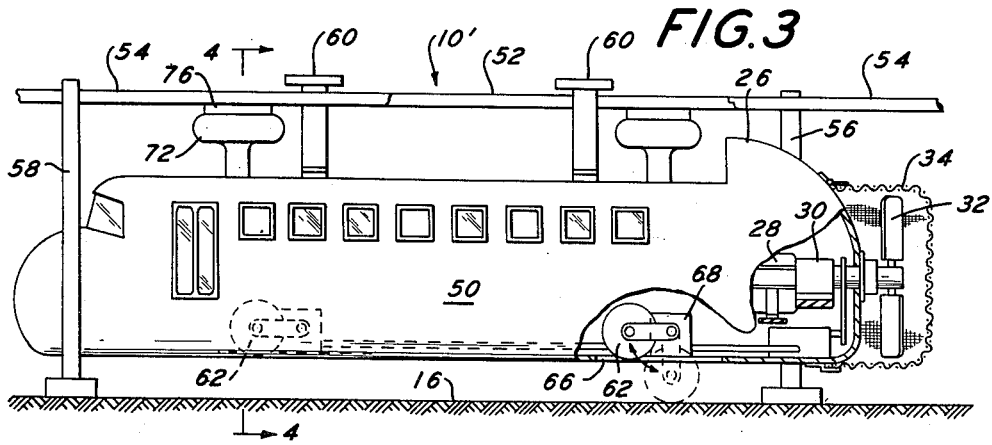
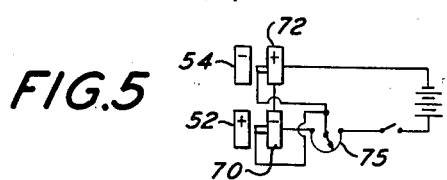
INVENTOR.
JERRY S. SILVERMAN
BY
Arthur H. Seidel
ATTORNEY

United States Patent Office 3,125,964
Patented Mar. 24, 1964

3,125,964
TRANSPORTATION APPARATUS
Jerry S. Silverman, 2112 N. 58th St., Philadelphia 31, Pa.
Filed Mar. 22, 1962, Ser. No. 181,757
3 Claims. (Cl. 104—89)

This invention relates to a transportation apparatus, and more particularly, to a transportation apparatus which may be of the monorail type.

The transportation apparatus of the present invention may be utilized for transporting any one of a wide variety of materials as well as persons. The apparatus of the present invention includes a vehicle disposed below and extending along an overhead rail means. A magnetic relationship is provided between the vehicle and the rail means with sufficient magnetic force being provided to offset the effect of gravity on the vehicle. In one embodiment of the present invention, the magnetic force is gauged for peak loads by biasing a portion of the vehicle away from the rail means with the vehicle riding on a layer of air as it moves along the rail means.

In another embodiment of the present invention, the magnetic member on a vehicle is biased toward but always slightly spaced from the rail means. In each embodiment of the present invention, the rail means does not support the weight of the vehicle in a conventional sense so that rolling friction need not be overcome. Hence, the vehicle may be propelled by means of a smaller power plant than that utilized on prior art monorail transportation apparatus and can attain greater speeds. Levitation systems have been proposed heretofore whereby the vehicle is biased upwardly from a supporting surface by means of pressurized air. The present invention differs from the levitation systems proposed heretofore in that the air space provided is between an overhead rail means and the vehicle, with such air space being provided by a magnetic force rather than pressurized air. The amount of the air space is provided by controlling the amount of magnetic force between the vehicle and the rail means, with the magnetic force always being approximately the amount necessary to overcome the gravitational effect on the vehicle.

In one embodiment of the present invention, air pressure is provided to raise the vehicle from ground level up to a point whereby the magnetic force between the vehicle and the rail means is sufficient to offset the effect of gravity. Thereafter, the necessity for the air pressure is eliminated and the means for providing such air pressure will be shut off. In another embodiment of the present invention, the vehicle is provided with retractable wheels. In their lowermost position, the wheels will support the vehicle in a position so that there will be magnetic attraction between the rail means and the vehicle sufficient to offset the effect of gravity on the vehicle. Thereafter, the wheels will be retracted to a position spaced from ground level.

It is an object of the present invention to provide a novel transportation apparatus.

It is another object of the present invention to provide a transportation apparatus wherein the effect of gravity on a vehicle is offset by a magnetic force between the vehicle and an overhead rail means.

It is another object of the present invention to provide a transportation apparatus wherein a magnetic force is utilized to provide an air space between a vehicle and a rail means to decrease the friction associated with a vehicle moving on and in contact with a support surface.

Other objects will appear hereinafter.

For the purpose of illustrating the invention there is shown in the drawings forms which are presently preferred; it being understood, however, that this invention is not limited to the precise arrangements and instrumentalities shown.

FIGURE 1 is a side elevation view of one embodiment of the apparatus of the present invention.

FIGURE 2 is a sectional view taken along the lines 2—2 in FIGURE 1.

FIGURE 3 is a side elevation view of another embodiment of the apparatus of the present invention.

FIGURE 4 is a transverse sectional view taken along the lines 4—4 in FIGURE 3.

FIGURE 5 is a diagrammatic sketch of a circuit diagram.

Referring to the drawing in detail, wherein like numerals indicate like elements, there is shown in FIGURE 1 a transportation apparatus designated generally as 10.

The apparatus 10 comprises a generally elongated vehicle 12 suspended below a rail means 14. The rail means 14 may be a monorail as illustrated in FIGURES 1 and 2. When the vehicle 12 is suspended below the monorail 14 as illustrated in FIGURES 1 and 2, it is above and spaced from ground level 16.

The monorail 14 is supported at spaced points along its length by generally L-shaped support columns 18. An electromagnetic means is provided to bias the vehicle 12 away from the ground level 16 and offset the effect of gravity on the vehicle 12. Such means may include a pair of electromagnets 20 above and spaced from the uppermost surface of the monorail 14. The magnets 20 are supported from the roof of vehicle 12 by support posts 19. The rail 14 may have flat sides on which roller wheels 21 and 22 make contact during curves in monorail 14. The wheels 21 and 22 prevent the vehicle 12 from leaving the monorail 14 when traveling at high speeds on curves.

Wheel 22 is rotatably supported by post 19. Wheel 21 is rotatably supported by post 23 which is telescopically mounted in column 23'. The magnetic forces of repulsion between monorail 14 and electromagnets 20 is adjusted so that at peak loads there will be an air layer of approximately one inch therebetween. In the event of a power failure, the magnets 20 on posts 19 will engage the monorail 14 and prevent the vehicle 12 from falling to the ground.

A means is provided to propel the vehicle 12 in a direction corresponding with the direction of the rail 14, with the vehicle 12 being supported and being guided by the rail 14 as a result of the magnetic forces therebetween and wheels 21 and 22. Such means includes a power plant 24 having an air inlet 26. A turbine 28 is shown diagrammatically within the power plant 24 and coupled to a transmission 30. A propeller 32 is coupled to the transmission 30 and driven thereby to propel the vehicle 12 in a direction corresponding with the direction of the rail 14. The speed and direction of movement of vehicle 12 depends on speed and direction of rotation of propeller 32. A wire cage 34 surrounds the propeller 32. Any one of a variety of other power plants may be utilized to propel the vehicle 12. For example, a friction wheel may be in rolling contact with the lowermost surface of the rail 14 and driven by the turbine 28 to propel the vehicle 12.

A compressor 36 is coupled to the transmission 30. A conduit connects the compressor 36 with a chamber 38 which is disposed along the bottom of the vehicle 12. The chamber 38 is in open communication with atmosphere by way of a plurality of apertures 40. When desired, by use of elements not shown and conventional in the art, the compressor 36 may be utilized to compress air and direct the same into chamber 38. Such compressed air will issue through the apertures 40 and raise the vehicle 12 upwardly to aid the magnetic force of repulsion between the magnets 20 and rail 14 to offset the effect of gravity and provide the air layer. Thereafter, the compressor 36 will be shut off. Hence, it will be seen that the vehicle 12 may be a fluid sustained vehicle for a short period of time. It will be obvious to those skilled in the art that other devices may be utilized to raise the vehicle 12.

In order for the vehicle 12 to be spaced from the rail 14, the magnets 20 will have the same charge as the rail 14 so that they repel each other. It is within the scope of the present invention to position the vehicle 12 above the rail 14 if desired. As the vehicle 12 gets lighter due to egress of its pay load, the air layer increases to a maximum point which may be three inches.

In FIGURES 3 and 4, there is disclosed another embodiment of the present invention designated generally as 10′. The transportation apparatus 10′ is identical with the apparatus 10 except as will be made clear hereinafter. The apparatus 10′ includes a vehicle 50 which is magnetically biased upwardly toward a positively charged rail 52 and a negatively charged rail 54. The rail 52 is supported by generally L-shaped support columns 56 and rail 54 is supported parallel thereto by means of spaced support columns 58.

A generally T-shaped safety guard 60 is provided at spaced points along the vehicle 50. The horizontally disposed portion of the safety guards is above and spaced from the plane of the rails 52 and 54. The vehicle 50 is provided with a pair of longitudinally spaced wheels 62, each mounted on an axle 64. The bottom wall of the vehicle 50 is provided with spaced apertures 66 which accommodate the arcuate movement of the wheels 62 from an operative to an inoperative disposition. The wheels 62 are selectively biased to an operative disposition as shown in phantom in FIGURE 3 by means of a hydraulic cylinder 68 connected to the axle 64.

When desired, the wheels 62 may be moved from an operative to an inoperative disposition by supplying motive fluid to the hydraulic cylinder 68. The vehicle 50 is provided with a propelling means identical with the propelling means described above. It will be noted that the propelling means for the vehicle 50 is not interconnected with the wheels to drive the same. The wheels 62 provide a means for supporting the vehicle 50 in the event that there is insufficient power to magnetically bias the vehicle 50 toward the rails 52 and 54. The safety guards 60 will prevent the vehicle 50 from crashing to the ground in the event of an emergency interruption in the power supply. Guide wheels (not shown) on telescoping arms may be provided on post 61 for cooperation with rails 52 and 54 to provide positive guidance on sharp curves.

The vehicle 50 is provided with two pairs of electromagnets 70 and 72. The magnets 70 and 72 of each pair are inter-connected by a conductive material. Each of the magnets 70 and 72 is provided with a pressure sensitive switch for impedance strain gauge shown diagrammatically at 74 and 76, respectively. The pressure sensitive switches 74 and 76 are in series with the magnets and vary the magnetic attraction between the rails 52 and 54 and the electromagnets as a function of the pressure between the switches 74 and 76 and the rails. An increase in the pay load causes the vehicle to drop slightly thereby decreasing the magnetic attraction and the pressure on the switches 74 and 76. Thereafter, the switches 74 and 76 will rapidly compensate for this change by increasing the field strength and thereby increasing the magnetic attraction. The magnetic attraction will increase or decrease as described above with changes in the pay load with the vehicle raising and falling slightly but quickly compensated for so as to maintain the air layer substantially constant. When the pay load remains constant, the air layer will remain constant. The frictional contact between the switches 74 and 76 and rails 52 and 54 is negligible and may be substantially reduced by having a roller at the end of the switches. Hence, it will be observed that vehicle 50 is calibrated for its minimum load.

The pressure switches 74 and 76 are only shown diagrammatically in the figures of the drawing. Per se, these switches are old and form no part of the present invention. A rheostat 75 may be provided in the electrical circuit for the electromagnets 70 and 72 shown diagrammatically in FIGURE 5, with the rheostat being controlled by the switches 74 and 76. As the pressure on the switches 74 and 76 increases, the rheostat will increase the resistance in the electrical circuit thereby decreasing the electromotive force of the magnets 70 and 72. By charging the rails 52 and 54, the magnets 70 and 72 will require a smaller electromotive force. The magnets 70 and 72 and the magnets 20 need not be larger nor is a large electromotive force required to offset the gravitational effect on the vehicles 12 and 50. For example, recent developments in this field have resulted in commercially available electromagnets which are several inches in diameter and capable of supporting 1,000 pounds with only two and one-half volts of electromotive force.

In each embodiment of the present invention, there is provided an overhead rail means with a vehicle below and extending along the rail means and a magnetic means biasing the vehicle away from the ground. The magnetic force is sufficient to offset the effect of gravity on the vehicle and means is provided for propelling the vehicle with the direction of propulsion being guided by the rail means. The vehicles 12 and 50 may be stopped by reversing the direction of rotation of the propeller 32.

The present invention may be embodied in other specific forms without departing from the spirit or essential attributes thereof and, accordingly, reference should be made to the appended claims, rather than to the foregoing specification as indicating the scope of the invention.

I claim:

1. A transportation apparatus comprising an overhead rail means, a vehicle below and extending along said rail means, magnetic means on top of said vehicle cooperating with said rail means to bias said vehicle away from ground level, the magnetic force of said magnetic means being sufficient to offset the effect of gravity on said vehicle, control means, said control means including gap sensing means sensitive to the gap between said magnetic means and said rail means, said control means maintaining the gap between said magnetic means and said rail means constant by control of said magnetic means in accordance with signals received from said gap sensing means, and means for propelling said vehicle with said vehicle being guided by said rail means.

2. A transportation apparatus comprising an overhead rail means, a vehicle below and extending along said rail means, magnetic means on top of said vehicle cooperating with said rail means to bias said vehicle away from ground level, the magnetic force of said magnetic means being sufficient to offset the effect of gravity on said vehicle, control means sensitive to the gap between said magnetic means and said rail means to maintain the gap constant by control of said magnetic means, means for propelling said vehicle with said vehicle being guided by said rail means, said magnetic means including an electromagnet, said control means comprising a pressure switch between said electromagnet and a rail of said rail means, said pressure switch controlling said electromagnet to vary the magnetic force between said rail and said electromagnet when said electromagnet is closer to said rail than a predetermined distance.

3. A transportation device in accordance with claim 1 wherein said vehicle is provided with a safety guard above and spaced from the plane of the rail means, said magnetic means being spaced below said rail means and biasing said vehicle toward said rail means, said safety guard preventing said vehicle from falling from said rail means due to failure of said magnetic means.

References Cited in the file of this patent

UNITED STATES PATENTS

| | | |
|---|---|---|
| 714,851 | Albertson | Dec. 2, 1902 |
| 936,825 | Smith | Oct. 12, 1909 |
| 1,020,943 | Bachelet | Mar. 19, 1912 |
| 1,727,720 | Kruckenberg | Sept. 10, 1929 |
| 2,969,751 | Toulmin | Jan. 31, 1961 |
| 3,006,288 | Brown | Oct. 31, 1961 |
| 3,013,505 | Burke | Dec. 19, 1961 |

FOREIGN PATENTS

| | | |
|---|---|---|
| 867,045 | Great Britain | May 3, 1961 |